July 26, 1960
A. L. KRAFT
2,946,488
METERING AND DISPENSING SYSTEMS
Filed Dec. 26, 1957
3 Sheets-Sheet 1
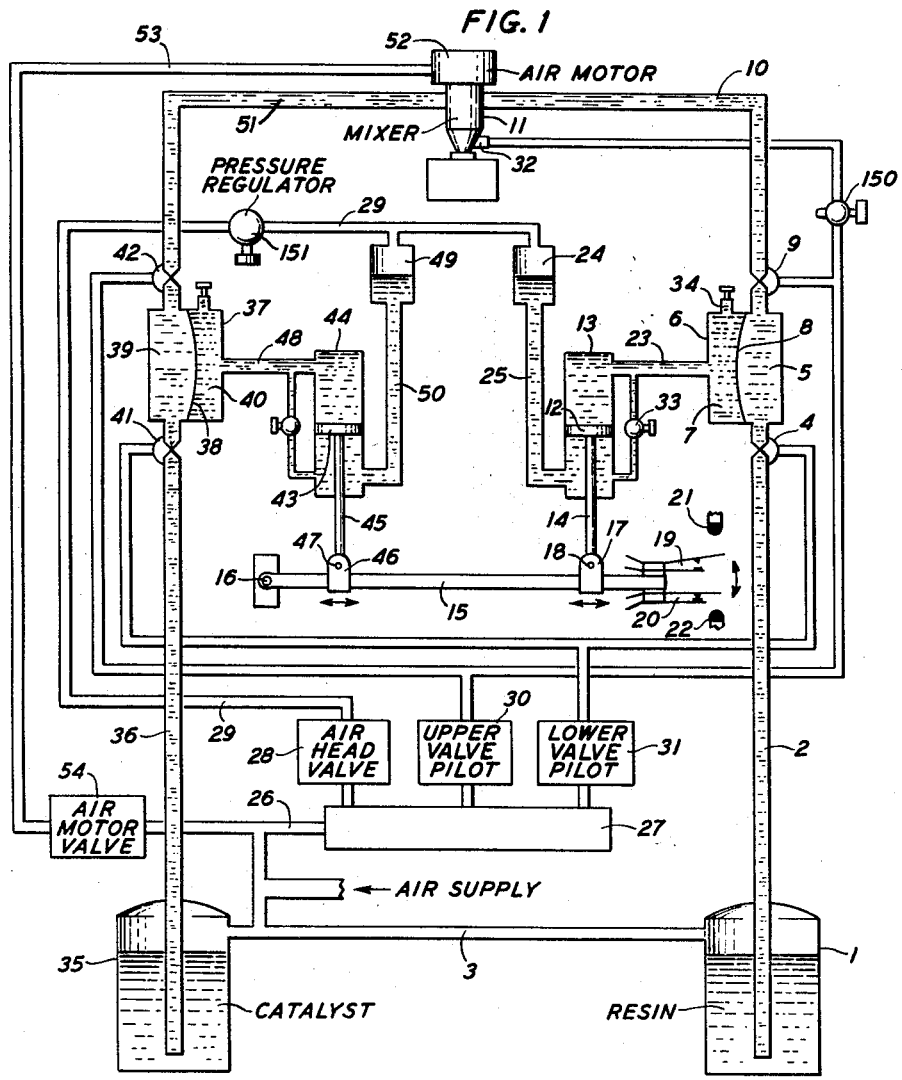
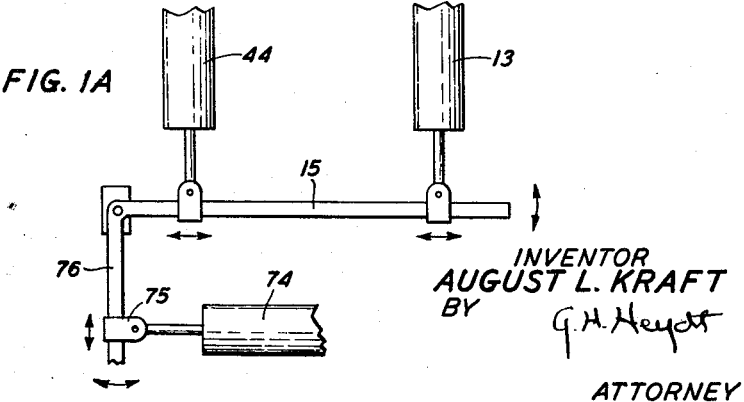
INVENTOR
AUGUST L. KRAFT
BY
G. H. Heydt
ATTORNEY July 26, 1960

A. L. KRAFT 2,946,488

METERING AND DISPENSING SYSTEMS

Filed Dec. 26, 1957

INVENTOR
AUGUST L. KRAFT
BY
G. H. Hyatt
ATTORNEY

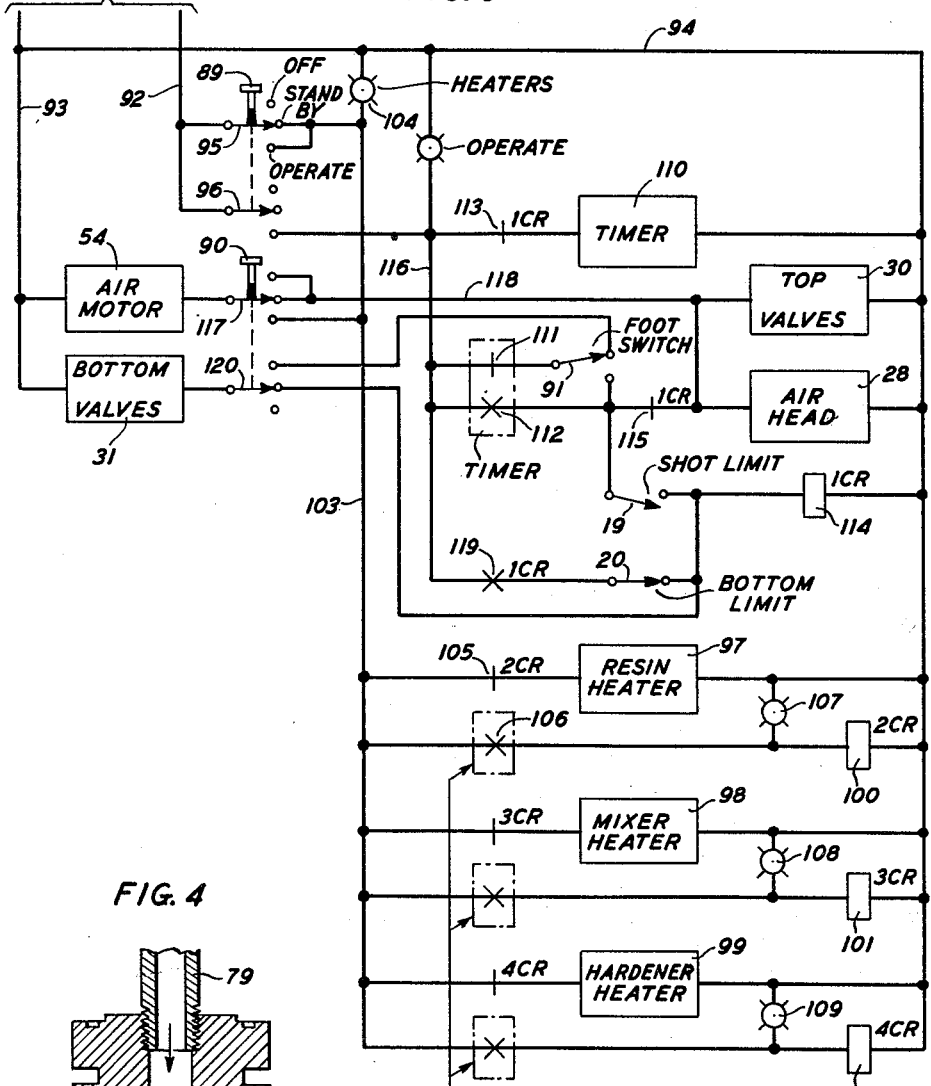
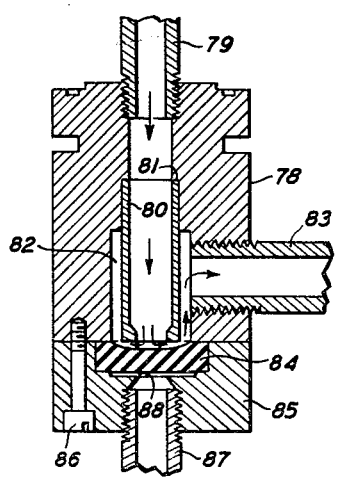

United States Patent Office 2,946,488
Patented July 26, 1960

2,946,488

METERING AND DISPENSING SYSTEMS

August L. Kraft, 120 Bender Ave., Roselle Park, N.J.

Filed Dec. 26, 1957, Ser. No. 705,259

13 Claims. (Cl. 222—134)

This invention relates to dispensing apparatus and systems to automatically mix, meter, and dispense filled, short port-life epoxies, polyesters, polyurethanes or other multiple component liquid systems. The equipment was originally designed for the electronic encapsulation field.

It is a primary object of the invention to provide a system of this type which will operate with a minimum amount of effort and with maximum reliability, and which will combine the ability to handle heated and filled resins with the ability to mix accurately and to pour shots of closely controlled volume.

It is a further object of the invention to provide a system in which the ratio of resin to catalyst may be automatically maintained with high repetitive accuracy and in which said ratio may be varied within wide limits by means of preliminary adjustment.

An additional object of the invention is attained by providing means to preset the volume of the dispensed shot by means of simple adjustment.

An outstanding feature of the invention resides in the provision of means for metering the resin and hardener by the employment of a piston-diaphragm combination which eliminates wear by completely isolating any abrasive material from any moving metal parts.

A further feature of the invention may be found in the use of pneumatically controlled check valves and a dispensing valve of novel design. These valves also eliminate wear by the traveling abrasive material.

An additional feature of the invention provides an automatic purge controlled by an electric timer, thus ensuring that the mixed material does not congeal in the dispensing head in case of an unusually long delay between shots.

In accordance with still another feature of the invention, the rate of discharge of the catalyzed material may be readily adjusted.

These and other objects and features of the invention will be more completely understood from the following detailed description, reference being had to the accompanying drawings.

In the drawings:

Fig. 1 is a diagrammatic layout of a preferred form of the invention showing the interrelation of the essential parts of a two-component system.

Fig. 1-A shows a modification by means of which a three-component system may be provided.

Fig. 1-B shows an alternative form of the invention in which the system is somewhat simpler than that shown in Fig. 1.

Fig. 3 is a diagram showing the essential operating circuits of the device.

Fig. 4 shows details of the structure of the novel dispensing valve which corresponds with the structure of the pneumatically controlled check valves.

Figure 1B:
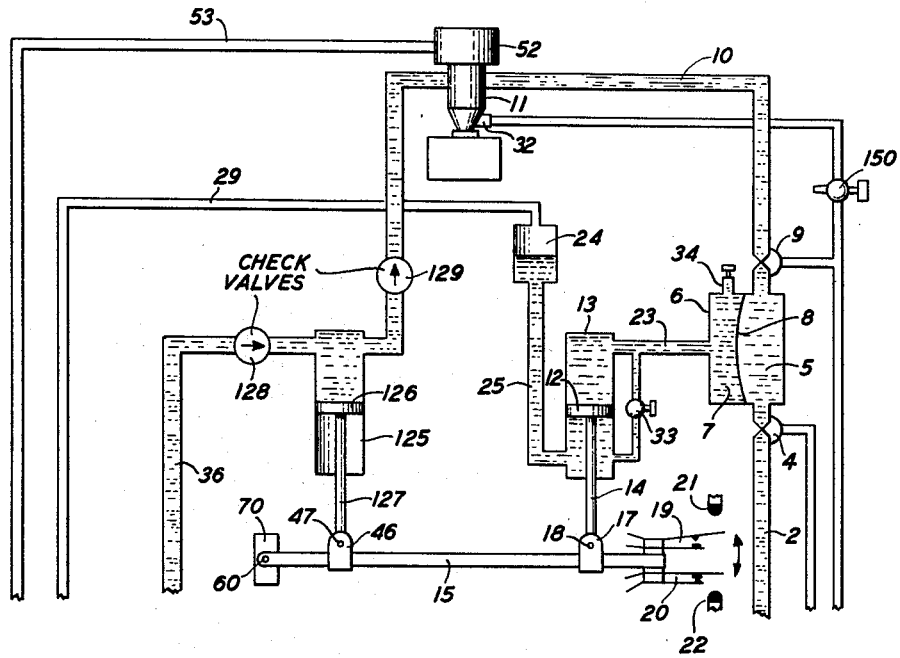

Referring now to Fig. 1, a reservoir 1 contains a supply of resin which may be forced into a plastic tube 2 under pressure from the source of air supply via a plastic tube 3. For purposes of economy it is usual to mix the resin with a filler which may be any one of a variety of inert and relatively cheap materials, such as silica. In practice, an air motor is provided to stir and suitably mix the contents of the reservoir. If desired, a heating coil may be provided about reservoir 1 in order to increase the fluidity of the mixture. Inasmuch as the stirring equipment and the heater may be of any conventional form and constitute no part of the invention, they have not been shown in detail in the drawing.

A valve 4 regulates the passage of the resin to the right hand cavity 5 of a chamber 6 in which cavity 5 and a left hand cavity 7 are formed by a septum 8. The septum 8 is a resilient diaphragm preferably made of silicone rubber, although other materials may be used.

The resin may be led from cavity 5 via valve 9, and plastic tube 10 to a mixing and dispensing head 11. A piston 12 is operatively mounted in a cylinder 13 and is connected by means of a piston rod 14 to an arm 15 which is pivoted for rotation about a pin 16. Piston rod 14 is connected to arm 15 by means of a clevis 17 and pin 18. Extent of travel of arm 15 is controlled by means of switches 19 and 20 which cooperate with stops 21 and 22 respectively. The cavity 7, a connecting tube 23 and the cylinder space above piston 12 are completely filled with oil.

In operation, with valve 4 open and valve 9 closed, flow of resin into cavity 5 will cause the resilient diaphragm to be distended to the left, thus forcing the oil in chamber 7 to flow to the left into cylinder 13 and produce downward motion of piston 12 and a corresponding downward motion of arm 15.

An oil reservoir 24 is connected via tube 25 to the bottom of cylinder 13. This oil may be put under pressure from the air supply via tube 26, air manifold 27 and air-head valve indicated generally at 28, pressure regulator 151 and tube 29.

It is obvious that during the flow of resin into cavity 5 the downward motion of piston 12 will force oil up into reservoir 24. As will be more fully set forth hereinafter, at the time piston 12 is moving downward tube 29 is vented to the atmosphere. The air-head valve is a solenoid operated device and is so arranged that in one position air pressure from manifold 27 is applied to tube 29 whereas in the alternate position of the valve, tube 29 is vented to the atmosphere. Construction details of the valve have not been shown as valves of this nature are available on the market.

From the foregoing, it will be understood that the extent of travel of piston 12 is a measure of the displacement of diaphragm 8, which in turn is a measure of the extent to which cavity 5 has been filled with resin. The oil which occupies the space between diaphragm 8 and piston 12 is thus a fluid metering medium and is the transmitting agency which controls the extent of motion of the piston. Upon completion of the downward stroke of piston 12, at which time the circuit controlled by switch 20 will be opened by contact between stop 22 and the switch spring, suitable circuits, to be described later, will be effective to produce closure of valve 4 and opening of valve 9. At this time, a full charge will have been stored in cavity 5. The valves are controlled by means of solenoid operated air valves indicated generally at 30 and 31 and labeled Upper Valve Pilot and Lower Valve Pilot on the drawing. These valves are generally similar to air-head valve 29. Construction details of the valves have not been shown. Simultaneously with the opening of valve 9 and the closure of valve 4, dispensing valve 32 will be opened and pressure will be supplied to oil reservoir 24 to produce upward pressure on piston 12. Piston 12 moves upward in response to this pressure, causing oil to flow from the upper part of cylinder 13 into cavity 7. This flow of oil forces diaphragm 8 to the right, expelling resin into mixing head 11 via tube 10. As the piston moves upward, it draws arm 15 upward. This action continues until the contacts of switch 19 engage stop 21, at which time suitable circuit changes are brought about to close the dispensing valve and upper valve 9, while at the same time valve 4 is opened and reservoir 24 is vented to the atmosphere. The system is then ready to repeat the above described cycle under control of the operator.

The rate of flow may be closely controlled by manual adjustment of pressure regulator 151, the function of which is to bleed off air to a greater or less degree until the desired rate of flow has been obtained.

It may be noted at this point that oil for the metering system may be supplied from reservoir 24 to tube 23 by way of a manually operated valve 33. During this operation entrapped air may be vented by means of a manually operated bleeder valve 34.

The catalyst is stored in a reservoir 35, from which it may be forced into a plastic connecting tube 36 under pressure from the air supply by way of an extension of tube 3.

A chamber 37 corresponds in construction and function with chamber 6. A resilient diaphragm 38 divides the chamber into two cavities 39 and 40. Flow into and out of cavity 39 is controlled by means of valves 41 and 42 which are identical with valves 4 and 9 and are operated in respective synchronism therewith. A piston 43 is operatively mounted in a cylinder 44 and is connected by means of a piston rod 45 to arm 15 by means of clevis 46 and pin 47. Cavity 40, connecting tube 48 and the cylinder space above piston 43 are completely filled with oil. Oil reservoir 49 is connected by way of tube 50 to the bottom of cylinder 44. The oil in reservoir 49 may be put under pressure from tube 29 at the same time that air pressure is applied to reservoir 24.

It is believed to be obvious that the metering system of the catalyst handling system functions in a manner identical with that of the resin metering system. A measured charge of catalyst is expelled from cavity 39 into the mixing head 11 by way of tube 51.

An air motor 52 drives a helical agitator, not shown, inside the mixing head 11. Air pressure is supplied to the air motor via tube 53 and solenoid operated air motor valve 54 which is connected by way of tube 26 to the air supply. The air motor valve may be any one of a variety of commercially available types.

In practice, immersion heaters are provided to heat chambers 5 and 39 and mixing head 11. The action of these heaters is controlled by conveniently located thermostats, preferably within the chambers containing the resin, the catalyst and the mixture respectively. As their structure forms no part of the present invention, neither the heaters nor the thermostats have been disclosed, but their functions and control circuitry will be described later as part of the complete circuit shown in Fig. 3.

Inasmuch as pistons 43 and 12 are operatively connected to the common arm 15, the extent of their travel is mutually interdependent and the stroke of each piston will be accurately reproduced in the course of each operational cycle.

Figure 2:
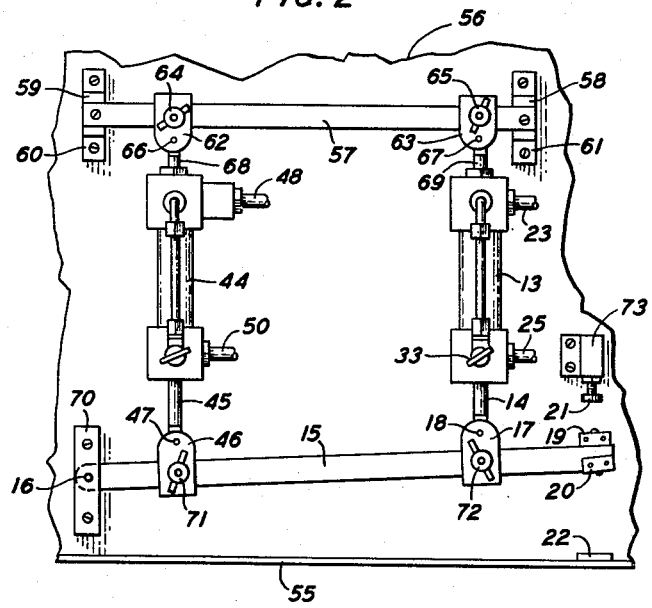
Fig. 2 shows structural details of a preferred form of the invention together with means for adjusting the ratio of resin to catalyst and the volume of the shot.

Referring now to Fig. 2, further construction details relative to the mounting of the cylinders and piston rods will be described. So far as possible like reference numerals have been applied to like parts. A base portion 55 supports a vertical wall member shown in part at 56. A guide member 57 is secured to offsetting blocks 58 and 59, which are in turn secured to supporting strips 60 and 61 by means of machine screws, or in any convenient manner. Similarly the supporting strips may be secured to wall 56 in any desired manner. U-shaped clevises 62 and 63 are slidably mounted on arm 57 and may be clamped thereon in any desired lateral position by means of thumb screws 64 and 65. Cylinders 44 and 13 are pivotally connected at clevis pins 66 and 67 by means of rods 68 and 69. Arm 15 is offset from wall 56 and pivoted to a mounting block 70 and is capable of rotary motion about mounting pin 16 as previously described. Clevises 46 and 17, like clevises 62 and 63, are U-shaped in section and are mounted for sliding motion along arm 15, to which they may be clamped in selected positions by means of thumb screws 71 and 72.

It is obvious that as cylinders 44 and 13 are moved to the right, as seen in the drawing, the extent of travel of the associated pistons will be increased, because of the longer arc produced by the lengthened effective radii. Similarly, the extent of travel of the pistons will be decreased upon motion of the cylinders to the left. As a result, any desired ratio of resin to catalyst may readily be obtained by changing the relative lateral positions of either cylinder with respect to the other. Lateral motion of the cylinders will alter the volume of the charge delivered to the mixing and dispensing head, which is always a function of the combined strokes of the pistons. After the cylinders have been laterally positioned on guide 57 and on arm 15, further total volumetric adjustment may be made by changing the position of stop 21, which is screw threaded into a support 73 secured to wall 56. Switches 19 and 20 are miniature switches, commercially available, and their structure needs no illustration.

The system is not limited to the metering and mixing of only two materials. Fig. 1A illustrates a system in which a third cylinder 74 may be connected to arm 15 through a clevis 75 slidably mounted on arm 76, which is a right-angle extension of arm 15. In this variation, arm 15 is L-shaped, but pivoted, as before, at 16. Many variants for producing relative motion between three or more cylinders are obviously possible.

Construction details of the valves and dispensing head shut-off valve will now be described. Referring to Fig. 4, a block 78 is drilled and tapped to receive a threaded connection 79 connected to one of the plastic tubes through which the material to be dispensed may travel. The block is bored out to three diameters. A sleeve 80, the inside diameter of which corresponds to the smallest bore, and the outer diameter of which corresponds to the diameter of the intermediate bore, is seated on shoulder 81. The annular space 82 produced by the difference in diameter between the largest bore and the exterior surface of sleeve 80, which extends into the large bore, is accessible to a coupling member 83 threaded into the side of block 79. Coupling member 83 is connected to one of the plastic tubes forming part of the dispensing system. A resilient disc 84 occupies a cut out cavity in a clamping member 85, which is secured to block 78 by means of machine screws 86. Air pressure for the control of the valve is supplied by way of pipe 87 threaded into block 85. A voided space 88 permits some motion of disc 84 which may be made of a tough resilient material such as silicone rubber.

The operation of the valve is as follows. In the absence of air pressure, material may flow downward through sleeve 80, and since it is under driving pressure, it is able to displace resilient disc 84 and flow, as indicated by the arrows, around the lips of the sleeve and into the space surrounding it, and thence into the hollow center of connecting member 83 and into the plastic tube. When air pressure is applied by way of pipe 87, disc 84, by virtue of its resiliency, is forced down firmly against the lip of sleeve 80 and shuts off flow therethrough. This form of valve has been found in practice to have a very positive action, and when used in the dispensing head assures drip-free cut-off.

The operating circuits of the system will now be described. Referring to Fig. 3, in addition to the limit switches 19 and 20, two manually operated switches and a foot switch are provided. These switches are indicated at 89, 90 and 91 respectively. Switch 89 is the power switch and is extended to one side of a power source by way of conductor 92. Conductors 93 and 94 extend connections to the other side of the power source. Switch 89 is provided with two wipers 95 and 96 and is a three-position switch. The first position of the switch is the "off" position, and in this position now power is connected to the system. The second position of switch 89 is a "stand-by" position. In this position, heaters 97, 98 and 99 are operated in multiple through normally closed contacts of their associated control relays 100, 101 and 102 respectively. It may be noted at this point that the circuit is in the form of a detached-contact diagram. Contacts associated with the various relays are labeled to correspond with the labelling of the relays by which they are controlled. In accordance with the convention used, vertical lines indicate normally closed contacts, whereas crosses indicate normally open contacts. Heater 97 provides heat for resin cavity 5, mixer heater 98 supplies heat to mixer 11, and heater 99 supplies heat to cavity 39. The parallel circuits for the heaters extend from conductor 94 through the heaters, conductor 103, the second contact served by wiper 95 and conductor 92, to the power source. At the same time, an obvious circuit is closed for lamp 104, which is lighted to indicate that the heaters are in operation. This lamp remains lighted in the third or "operate" position of switch 89. The circuit for heater 97 extends through normally closed contact 105 of relay 100. A branch circuit for relay 100 is closed when normally open contacts 106 are closed by action of the associated thermostat, which action takes place as soon as the resin has attained proper temperature. Relay 2CR, upon energization, opens the circuit of heater 97 at contact 105, and permits indicating lamp 107 to light, the circuit for this lamp being in parallel with the winding of relay 2CR. The circuits for heaters 98 and 99 function in a manner identical with that just described for heater 97, and will not be described in detail. Lamps 108 and 109 associated with the mixer and hardener heaters respectively are lighted when correct temperatures are obtained at these points. The lighting of indicating lamps 107, 108 and 109 informs the operator that the device is ready for operation.

Referring again to the circuit of heater 97, a fall in temperature of the resin will cause the thermostat to operate to reopen contact 106. The opening of this contact opens the circuit of relay 2CR and lamp 107. The relay releases and recloses contact 105 to reestablish the heating circuit for heater 97. This cycle continues for all the heaters as long as switch 89 is in either position 2 or 3.

Manually operated function switch 90 is also a three-position switch and permits three types of operation to be attained. In the second position of function switch 90, the device will discharge cavities 5 and 39 completely in response to operation of foot switch 91 and limit switch 19. The machine will then fully recharge under the control of its automatic circuits and bottom limit switch 20. In position 1 of the function switch, shots of limited volume may be discharged intermittently at the will of the operator until the entire charge has been released, as indicated by the operation of the upper-limit switch. Position 3 is used only when the machine is to be purged.

The relation between the solenoid operated pneumatic valves and the material blocking valves is such that with the solenoid energized, pressure to the valves is shut off to permit the valves to open, and, upon deenergization of the solenoids, the valves close. As is obvious from an inspection of Fig. 1, opening or closing of the upper valves is accompanied by a simultaneous opening or closing of the shut off valve in the dispensing head. The solenoid generally indicated at 29 in Fig. 3, upon energization, supplies driving air pressure to reservoirs 24 and 49. Similarly, air is supplied to the air motor which drives the mixer upon energization of the solenoid indicated at 54.

The mixture in the dispensing head is in catalyzed form and will therefore have a tendency to set unless ejected at predetermined time intervals. A timer is used to provide for automatic ejection of the mixture in case no shots are made by the operator within a specified time interval. The timer 110 controls a normally closed contact 111 and a normally open contact 112. When the circuit of the timer is completed, an electric clutch couples a simultaneously energized driving motor to a contact-operating arm. The arm is driven until the timer contacts are operated. Interruption of the timer circuit deenergizes the driving motor and simultaneously deenergizes the electric clutch. Upon release of the clutch, the contact operating arm returns to normal position under the influence of the spring.

When the machine is to be operated, the power switch is moved into its third position, and assuming that a complete charge is to be delivered with each shot, function switch 90 is placed in its second position. It will be assumed that a complete cycle has been concluded, and that as a result, the upper limit switch 19 is open and bottom limit switch 20 is also open as a result of the completion of the charging cycle. Under these conditions, no circuit exists for solenoid 31, and the bottom valves are closed. The foot switch 91 is then depressed by the operator and maintained in depressed position for the duration of the discharge. Timer 110 will be in operation, its circuit extending from conductor 94 by way of normally closed contacts 113 of 1CR relay 114 and the third contact and wiper 96 of the power switch to conductor 92.

When foot switch 112 engages its lower contact, parallel circuits for solenoids 30 and 28 are completed by way of normally closed contact 115 of the 1CR relay, normally closed timer contacts 111 and thence to the lower arm of the power switch by way of conductor 116. Another parallel circuit is closed at the same time from conductor 93, air motor controlling solenoid 54, wiper 117 of the function switch and its associated first contact, conductor 118 and thence to conductor 92 over the path just described. With the lower valves closed, the upper valves open and air pressure being applied to the oil reservoirs, the pistons are driven upward, producing upward motion of arm 15 (Fig. 1). As soon as arm 15 leaves its extreme bottom position, bottom limit switch 20 closes. Discharging of the system will now continue until arm 15 reaches its upper limit, at which time switch 19 closes. Relay 1CR is thereupon energized over a circuit extending from conductor 94, winding of relay 1CR, closed limit switch 19 and thence to the lower contacts of the foot switch, from which the circuit extends to conductor 92, as previously described. Upon energization, relay 1CR opens contact 113 and 115, and closes normally open 1CR contact 119. The opening of contacts 113 permits the timer to return to normal position. Relay 1CR completes a locking circuit for itself by way of limit switch 20, contact 119 to conductor 116. Closure of contact 119 also completes a circuit from conductor 93, bottom valve solenoid 31, function switch arm 120 and its second contact and limit switch 20 to conductor 116. The energization of solenoid 31 opens the lower valve. The opening of 1CR contact 115 deenergizes solenoids 54, 30 and 28, thus cutting off air from the mixer motor, closing the top valves and removing air pressure from the oil reservoirs. Under these conditions, resin and catalyst are injected into the system until deformation of the diaphragms and the resultant oil flow into the upper portions of the cylinders has produced enough downward motion of arm 15 to cause bottom limit switch 20 to open. When switch 20 opens, the circuit for bottom valve solenoid 31 and relay 1CR is opened, bringing about closure of the bottom valve and the release of relay 1CR. Reclosure of 1CR contacts 113 and 115 and the opening of contact 119 complete the cycle of operation and the equipment is ready for reoperation under control of the foot switch.

With the function switch in its second position, intermittent shots of desired volume may be made by the operator. Each release of the foot switch will deenergize solenoids 54, 30 and 28 and cut off flow of material. Shots of desired size may be made at intervals until the entire charge has been dispensed, at which time upper limit switch 19 operates to energize the 1CR relay, whereupon the system will recharge in the manner previously described. If it is desired to make intermittent shots of a volume total greater than the charged capacity of the system, additional material may be made available by moving the function switch into its first position. In this position, bottom check valve solenoid 31 is energized by the contacts closed in the normal position of the foot switch over an obvious circuit. Bearing in mind that with the foot switch in its normal position the top valves will have closed, so that when the bottom valves open the system will recharge during the intervals between successive depressions of the foot switch.

Position 3 of the function switch is used when it is desired to purge the system. In this case, cleaning agents under pressure are connected to the tube 10 at any convenient point above check valve 9 and valve 150 is manually turned to its alternate position. The valve in its alternate position maintains air pressure on valve 9, but vents the air-tube to the dispensing valve to the air, permitting the dispensing valve to open. An obvious circuit for air motor solenoid 54 exists by way of function switch wiper 117 and its third contact and power switch wiper 95, which may be in either its second or third position. Under this condition, the air motor provides agitation to thoroughly purge the dispensing head.

Fig. 1B illustrates a simplified form of the invention. Inasmuch as the right hand portion of this figure is identical with the right hand portion of Fig. 1 and operates in an identical manner, a detailed description is believed to be unnecessary. Like parts bear like reference characters in both figures.

In this device metering of the catalyst is controlled by a simple cylinder pump comprising a cylinder 125 and a reciprocating piston 126 which is connected to and driven by an arm 127 which may be slidably mounted on arm 15 by the clevis 46 and pin 47 of Fig. 1. Valves 128 and 129 are provided to enable the pump to operate in a conventional manner.

In this modification, energy for the pumping action for the catalyst is supplied by piston 12 which is caused to reciprocate during charge and discharge cycles of the machine in a manner identical with that previously described. As is obvious, this arrangement provides substantial economies, due to the elimination of pneumatically controlled valves, a metering chamber and an oil reservoir.

What is claimed is:

1. In a mixing and metering system, a plurality of sources for materials to be individually metered and then intermixed, a metering device individual to each of said materials, means to operate each of said devices in a two-stage cycle, said cycle consisting of a measuring stage and an ejection stage, a single mechanically movable member, means to adjustably connect each of said metering devices to said member independently of the position of the other of said metering devices, the volume to be measured by each of said devices being a joint function of the movement of said member and of the positional adjustment of said device upon said member, primary power means to propel said member in a metering movement, whereby said metering devices in the first stage of cyclic operation simultaneously measure said materials in a selected volumetric ratio with respect to one another, secondary power means to propel said member during the ejecting stage to expel measured volumes of said materials from said devices, and a utilization chamber to receive said materials.

2. The system as claimed in claim 1 in comibnation with automatic means operative within said utilization chamber to mix said materials.

3. The system as claimed in claim 2 in combination with automatically controlled dispensing means.

4. In a mixing and metering system, a plurality of sources for materials to be individually metered and then intermixed, means to apply pressure to each of said materials a metering device individual to each of said materials including a resilient diaphragm, means to distort said diaphragm in response to pressure upon the associated material a fluid motion-transmitting medium displaceable by said diaphragm, a cylinder, piston, and piston rod assembly, said piston being capable of a metering displacement in response to motion of said transmitting medium, a movable member, means to adjustably connect each of said piston rods to said member, the volume to be measured by each of said agencies being a joint function of the movement of said member and of the positional adjustment of the associated piston rod upon said member, and means to propel said member in a metering movement, whereby said metering devices simultaneously measure a selected volume of each of said materials in a selected volumetric ratio with respect to one another.

5. In a mixing and metering system, a plurality of sources for materials to be individually metered and then intermixed, a metering device individual to each of said materials, a unitary member pivotally mounted for rotary motion of variable extent, means to adjustably connect each of said metering devices to said member at differing radial positions on said member independently of the position of the other of said metering devices, the volume to be measured by each of said devices being a joint function of the extent of rotary motion of said member and of the radial position of said device upon said member, means to rotate said member in a metering movement, whereby said metering devices simultaneously measure said materials in a selected volumetric ratio with respect to one another.

6. In a mixing and metering system, a plurality of sources for materials to be individually metered and then intermixed, means to apply pressure to each of said materials a metering device individual to each of said materials including a resilient diaphragm, means to distort said diaphragm in response to pressure upon the associated material a fluid motion-transmitting medium displaceable by said diaphragm, a cylinder, piston and piston rod assembly, said piston being capable of a metering displacement in response to motion of said transmitting medium, a member pivotally mounted for rotary motion, means to adjustably connect each of said piston rods to said member at differing radial positions on said member, the volume to be measured by each of said devices being a joint function of the extent of rotary motion of said member and of the radial position of the associated piston rod upon said member, means to rotate said member in a metering movement, whereby said metering devices simultaneously measure a selected volume of each of said materials in a selected volumetric ratio with respect to one another.

7. The system as claimed in claim 6 in combination with displacing means, mixing means, automatically controlled dispensing means and means to control the rate of flow from said dispensing means.

8. In a mixing and metering system, a hollow chamber, a resilient diaphragm forming a septum to divide said chamber into two cavities, a fluid material to be dispensed, a metering fluid in one of said cavities, a source of air under pressure, means to force said dispensable liquid into the second one of said cavities and distort said diaphragm and thereby expel said metering fluid from said first cavity, a cylinder, a piston disposed therein, means to produce motion of said piston in a first direction under pressure from said metering material, means to produce motion of said piston in a reverse direction in response to the application of air pressure from said source, a movable arm, a piston rod operatively connected to said piston and to said arm, means adjustably controlled to define upper and lower limits of travel of said arm, a dispensing head connected to said second cavity, a system of pneumatically operated valves, electromagnetic means to control the application of air pressure to said valves, an operating switch, and means including said switch, said valves and said air pressure system to dispense from said dipensing head a predetermined desired volume of said dispensable material as determined by the displacement of the metering fluid in accordance with the operational adjustment of said travel-defining means.

9. The system as claimed in claim 8 in combination with an air-pressure regulator and means to adjust the air-pressure during reverse motion of said piston, whereby the rate of discharge from said dispensing head may be varied at will.

10. The system as claimed in claim 8 in combination with one or more like systems, and means to connect the dispensing head and the movable arm of said claim to all of said systems in common.

11. The system as claimed in claim 10 in combination with means to adjustably vary the relative spacing of the connections of said piston rods to said arm, whereby said materials are dispensed in a selected volumetric ratio with respect to one another.

12. In a mixing and metering system, the combination of a hollow chamber, a resilient diaphragm forming a septum to divide said chamber into two cavities, a fluid material to be dispensed, a metering fluid in one of said cavities, a source of air under pressure, means to force said dispensable liquid into the second one of said cavities and distort said diaphragm and thereby expel said metering fluid from said first cavity, a cylinder, a piston disposed therein, means to produce motion of said piston in a first direction under pressure from said metering material, means to produce motion of said piston in a reverse direction in response to the application of air pressure from said source, a movable arm, a piston rod operatively connected to said piston and to said arm, means adjustably controlled to define upper and lower limits of travel of said arm, a dispensing head connected to said second cavity, a system of pneumatically operated valves, electromagnetic means to control the application of air pressure to said valves, an operating switch, a piston pump, valves for said pump, a second material to be propelled by said pump, an operative driving connection from said piston pump to said movable arm, means to adjustably vary the spatial relation of the several connections to said arm, connections from said piston pump to said dispensing head, and means including said switch, said valves and said air-pressure system to dispense from said dispensing head a predetermined desired volume of a mixture of both of said materials as determined by the displacement of the metering fluid in accordance with the operational adjustment of said travel-defining means.

13. In a metering system, a source for material to be metered, means to apply pressure to said material, a metering device for said material including a resilient diaphragm, means to distort said diaphragm in response to pressure upon said material, a fluid motion-transmitting medium displaceable by said diaphragm, a cylinder, piston and piston rod assembly, said piston being capable of a metering displacement in response to motion of said transmitting medium, a movable member, means to adjustably connect said piston rod to said member, the volume to be measured by said metering device being a joint function of the movement of said member and of the positional adjustment of the piston rod upon said member, and means to propel said member in a metering movement, whereby said metering device measures a selected volume of said material.

References Cited in the file of this patent

UNITED STATES PATENTS

| | | |
|---|---|---|
| 1,723,234 | Gwynn et al. | Aug. 6, 1929 |
| 1,964,028 | Boynton et al. | June 26, 1934 |
| 2,036,810 | Hurrell | Apr. 7, 1936 |
| 2,354,634 | Griswold | July 25, 1944 |
| 2,475,075 | Chancellor | July 5, 1949 |
| 2,788,953 | Schneider | Apr. 16, 1957 |

FOREIGN PATENTS

| | | |
|---|---|---|
| 438,310 | Great Britain | Nov. 14, 1935 |